(No Model.)

C. V. MOORE.
AXLE SPINDLE AND BEARING.

No. 388,214. Patented Aug. 21, 1888.

WITNESSES:
Phil C. Dieterich
C. Seagirck

INVENTOR:
C. V. Moore
BY Munn & Co
ATTORNEYS.

UNITED STATES PATENT OFFICE.

CHARLES V. MOORE, OF FAIRMOUNT, INDIANA.

AXLE-SPINDLE AND BEARING.

SPECIFICATION forming part of Letters Patent No. 388,214, dated August 21, 1888.

Application filed September 29, 1887. Serial No. 250,183. (No model.)

*To all whom it may concern:*

Be it known that I, CHARLES V. MOORE, of Fairmount, in the county of Grant and State of Indiana, have invented a new and Improved Vehicle-Spindle and Bearing, of which the following is a full, clear, and exact description.

The object of my invention is to provide a new and improved vehicle-spindle which fits always snugly in the bearing, thus causing the wheel to last much longer and preventing all noise by the spindle, as there is no play whatever in the bearing.

The invention consists in the construction and arrangement of various parts and details and combinations of the same, as will be hereinafter more fully described, and pointed out in the claims.

Reference is to be had to the accompanying drawings, forming a part of this specification, in which similar letters of reference indicate corresponding parts in all the figures.

Figure 1:
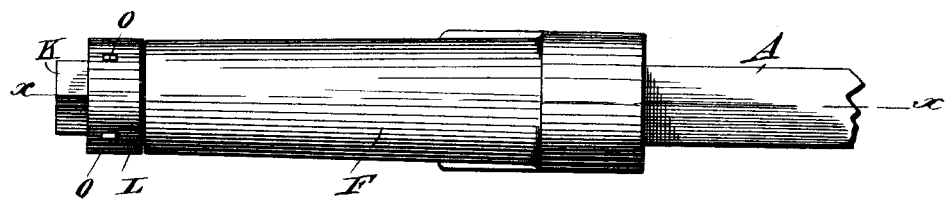
Figure 2:
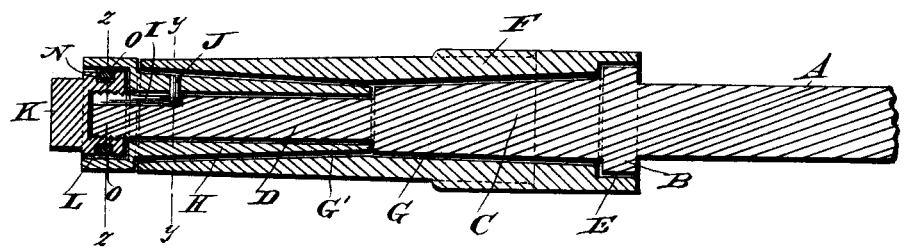
Figure 3:
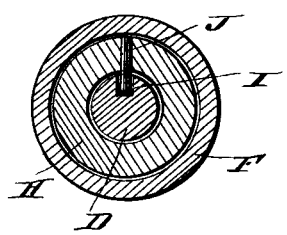
Figure 4:
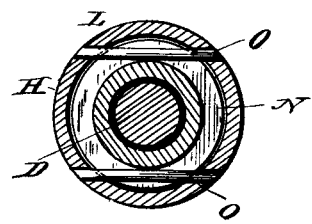

Figure 1 is a plan view of my improvement. Fig. 2 is a longitudinal sectional elevation of the same on the line x x of Fig. 1. Figs. 3 and 4 are sectional views of the same, taken, respectively, on the lines y y and z z of Fig. 2.

The axle A is provided near each end with a collar, B, from which extends the conical spindle C, carrying the rod D, which is screw-threaded on its outer end. The collar B fits into a corresponding recess, E, formed on the inner end of the bearing F, and the conical spindle C fits into a correspondingly-shaped opening, G, in the said bearing F. The rod D passes through the sleeve H, formed into a conical shape on its outside, and which latter fits into a similarly-shaped opening, G', in the bearing F. The sleeve H extends with its small end to within a short distance of the small end of the conical spindle C, and the openings G and G' are similarly formed, flaring outwardly from about the middle of the bearing F.

Near the outer end of the rod D is formed a groove, I, into which extends the pin J, secured to the sleeve H, so that the latter is prevented from turning on the rod D. On the outer threaded end of the rod D screws the nut K, extending into a recess formed on the enlarged end L of the sleeve H, the said end L abutting against the outer end of the bearing F. On the nut K is formed an annular recess, N, through which pass the pins O O, held in the end L of the sleeve H, so as to hold the nut in the sleeve for convenience when removing the wheel. The bearing F is secured in the usual manner to the hub of the wheel.

It will be seen that the sleeve H is held in a snug position in the opening G' of the bearing F by the nut K, and all wear on the said sleeve and spindle C is taken up by adjusting the said nut K on the threaded end of the rod D, extending from the spindle C. Thus it will be seen that the spindle always fits its bearing F, thereby avoiding all play, whereby the wheel lasts much longer, as play on the spindle in its bearing permits the wheel to yield by its load, in consequence of which the spokes of the wheel are loosened in the hub or in the rim, or the latter is split. When the wheel runs true, as it does with my improvement, the load of the wagon rests perpendicularly on the wheel, and consequently presses with less strain on the wheel than if the latter had play.

Having thus described my invention, what I claim as new, and desire to secure by Letters Patent, is—

1. The combination, with a conical spindle provided with the reduced portion D, of the sleeve H, locked to the reduced end of the spindle, to turn therewith, and provided with an enlarged and apertured end, L, the nut K, screwed on the end of the reduced portion of the spindle, and provided with recess N, and the pins O in the recess N and apertures of the end L of the sleeve H, substantially as herein shown and described.

2. In a vehicle-spindle and bearing, the combination, with the bearing F, having the outwardly-flaring openings G G', of the spindle C, having the reduced portion D, screw-threaded at its outer end and provided with the groove I, the sleeve H, having the enlarged end L and provided with the pin J, the nut K, having the annular recess N, and the pins O, substantially as herein shown and described.

CHARLES V. MOORE.

Witnesses:
JOHN F. JONES,
W. A. BROWN.